United States Patent Office 3,478,846
Patented Nov. 18, 1969

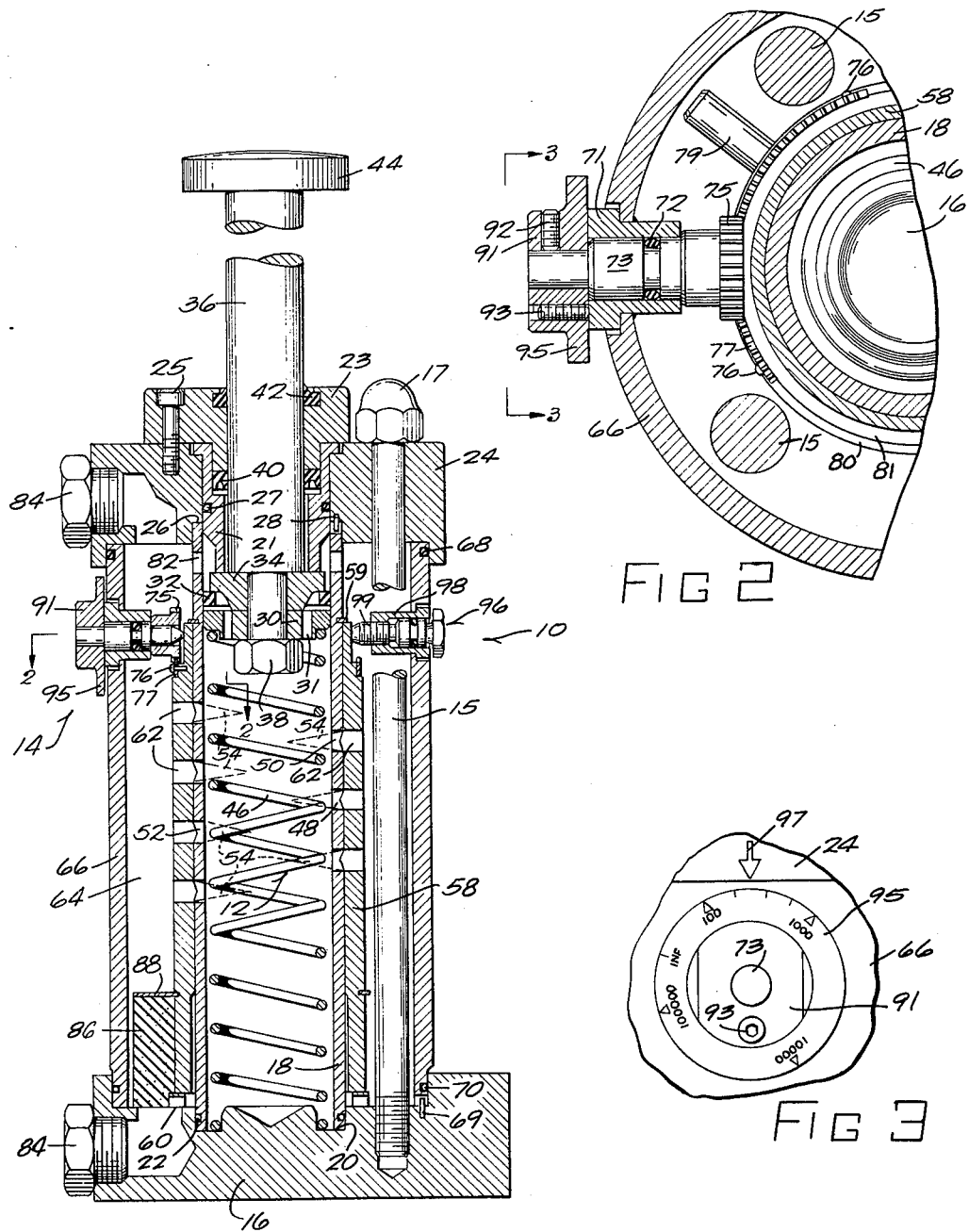

3,478,846
ADJUSTABLE SHOCK ABSORBER
Henry S. Germond IV, Evanston, Ill., assignor to Rex Chainbelt Inc., Milwaukee, Wis., a corporation of Wisconsin
Filed May 2, 1968, Ser. No. 726,187
Int. Cl. F16d 57/00
U.S. Cl. 188—97                    2 Claims

ABSTRACT OF THE DISCLOSURE

An adjustable hydraulic shock absorber having circumferentially elongated fluid passage means extending through the walls of a pair of concentrically disposed cylinders. The cylinders are relatively rotatable to vary the effective cross-sectional flow area of the passage means. Relative rotation of the cylinders is effected by means of a pair of mating gear elements, one of which is integral with one of the cylinders; and the other of which is attached to a turning mechanism extending externally of the shock absorber. An indicator, calibrated on the basis of the pitch diameter of one of the gear elements, is operatively associated with the turning mechanism to externally register the relative angular position of the cylinders and therefore the rated loading of the shock absorber corresponding to that relative angular position.

---

This invention relates to improvements in adjustable hydraulic shock absorbers of the type that may be field adjusted to provide uniform deceleration and stopping of any load provided only that its weight, velocity and propelling force produce a total kinetic energy which is within the capacity of the shock absorber. An example of the type of adjustable shock absorber to which this invention relates is disclosed in United States Patent No. 3,344,894, and reference is made to that patent for a description of the operation of such shock absorbers.

More particularly, the present invention relates to mechanism for effecting adjustment of such shock absorbers and to the indicating means associated therewith, whereby accurate and positive adjustment of the shock absorber to a predetermined load capacity can be achieved.

In the aforementioned United States patent there is disclosed a turning mechanism utilizing a rotatable annular adjusting band connected with a pin extending through a circumferentially extending slot in the wall of reservoir cylinder. This mechanism was generally acceptable for its intended purpose; however, it was subject to several problematical shortcomings. Leakage of hydraulic fluid through the circumferentially extending pin slot in the reservoir wall was difficult to control; moreover, effective seals for this opening proved to be expensive, awkward and bulky. Furthermore, manipulation of the annular adjusting band was cumbersome, and utilization of the annularly extended indicating indicator was difficult when the shock absorber was disposed in a crowded position relative to adjacent equipment and structure. In addition, it was found to be difficult to associate with the turning mechanism a suitable device for securing the mechanism against accidental movement after the desired setting had been established. Any conceivable releasable securing mechanism involved an intolerable aggravation of the sealing problem or was prohibitive from a cost standpoint.

It is therefore the object of the present invention to provide a device whereby all of the above discussed shortcomings may be eliminated. More particularly, it is an object of the present invention to provide a mechanism for effecting adjustment of a shock absorber of the type referred to which has the characteristics of being simple, inexpensive and positive in its movement. A further object is to provide a turning mechanism the design of which allows the employment of tried and proven sealing means. A still further object is to provide a turning mechanism and associated indicating means ideally and uniquely adapted for using in conjunction with an adjustable shock absorber of the type described.

To accomplish these and other objects that will become apparent, in accordance with the present invention there is provided an adjustable hydraulic shock absorber comprising a hydraulic shock absorber cylinder including a piston operably mounted therein, and an outer tubular cylinder rotatably positioned over the shock absorber cylinder so that at least a portion of the inner surface of the outer cylinder is contiguous to the outer surface of the shock absorber cylinder. Hydraulic fluid passage means extend through the shock absorber cylinder and the outer tubular cylinder, the passage means being elongated a predetermined distance in the circumferential direction of said cylinders where said cylinders are contiguous to each other, in such fashion that rotation of one of said cylinders relative to the other is operative to vary the effective cross-sectional flow area of said passage means and correspondingly the resistance to flow of fluid therethrough. Mechanism is provided for rotating one of the cylinders to provide a substantially infinite number of relative angular positions over a limited range, which mechanism includes a circumferentially extending gear rack integral with the rotatable cylinder and a mating pinion gear which has attached thereto a turning mechanism extending externally of said shock absorber for access. An indicator scale, the increments of which are a direct function of the pitch diameter of the pinion gear, is operatively associated with the externally extending turning mechanism for indicating the relative annular position of the cylinders.

These and other objects and advantages will appear in the following detailed description of the invention having reference to the accompanying drawings in which:

FIGURE 1 is a sectional elevation view taken through the center of an adjustable hydraulic shock absorber embodying the present invention;

FIG. 2 is a partial sectional elevation view taken along line 2—2 of FIGURE 1; and FIG. 3 is a partial end view taken along line 3—3 of FIG. 2.

Referring to the drawings, adjustable hydraulic shock absorber 10 includes a shock absorber assembly 12 and an adjustment assembly 14 integrally related. Both the adjustable shock absorber assembly and the adjustment assembly are supported on a one-piece back head 16 and the shock absorber assembly includes a cylindrical wall or inner metering tube 18 which may be precision honed seamless tubing and this tube is mounted in an annular well 20 in back head 16 and sealed by an O-ring seal 22. The top of the shock absorber 10 shown in FIGURE 1 includes a front head 24 which is secured to the back head 16 by a series of annularly spaced tie bolts 15 which thread into the back head 16 and are held in place by cap nuts 17 threaded to their front ends. The front head 24 includes an annular recessed shoulder 26 within which the top of the inner metering tube 18 is received. A pin 28 prevents rotation of the tube 18.

The shock absorber includes a piston 30 for operating within the cylinder formed by tube 18. The piston has a passage 31 through the head thereof and carries a movable piston ring check valve 32 between the piston 30 and a follower 34. The piston and follower are mounted on a small diameter portion of piston rod 36 and secured thereon by threaded nut 38. The piston rod 36 extends through the front head 24, which is provided with a suitable seal assembly comprising an annular gland member 21 and an operatively associated gland retainer bushing 23 threadably secured to the front head 24 by bolts 25. Suitable packing 40 is disposed between the end of bushing 23 and gland member 21. In addition a rod scraper 42 is arranged near the outer surface of retainer bushing 23. An O-ring seal 27 is provided on the outer surface of gland member 21 to seal that member with respect to the inner surface of front head 24.

The outer end of the rod 36 is provided with a bumper 44. Within the inner cylinder wall 18 and below piston 30 there is provided a return spring 46 for returning the piston rod 36 and piston 30 to the position shown in FIGURE 1 when there is no load placed on the shock absorber.

The inner metering tube 18 includes a plurality of ports 48, 50, 52, etc. For better spacing, the ports are staggered in opposite sides of the metering tube and are spaced longitudinally of the axis of the metering tube 18 in order to provide a uniform deceleration over the full stroke of the shock absorber and the softest stop thereof. In other words, the positioning of the ports 48, 50, 52, etc., control the outflow of the hydraulic fluid when a force is applied to bumper 44 and by suitable positioning of these holes, the shock absorber gradually decelerates and gently stops any moving load because as each port 48, 50, 52 was covered up the remaining outlet area is correspondingly less for the incompressible hydraulic fluid to escape from.

In order to further adjustably control the amount of kinetic energy absorbed by the shock absorber while still providing for gradually decelerating and gently stopping the moving load, there is provided in an arrangement for controlling the outflow from all of the ports 48, 50, 52, etc. simultaneously. One such arrangement is shown in the above mentioned United States Patent No. 3,344,894, and reference is made thereto for details of that arrangement, which includes a series of uniquely constructed grooves 54 in the outer surface of metering tube 18, there being one groove 54 communicating with each orifice.

Surrounding the inner metering tube 18 and closely fitting thereon for rotation thereabout is an outer cylinder wall or outer metering tube 58 which is biased upwardly by wave spring 60 positioned on back plate 16. Tube 58 is located axially on tube 18 by the ring 59 which is engaged by the upper end of tube 58. Ring 59 is mounted in a circumferential groove formed in tube 18 and forms a flange which projects therefrom. The outer metering tube has a plurality of outlet ports 62 at the level of each groove 54 and corresponding in one position of the outer tube 58 to the orifices 48, etc., in the inner tube 18 (see FIGURE 1). However, the outer tube may be rotated by the adjustment assembly 14 to position the orifice at an angular position remote from its corresponding orifice.

Surrounding the outer metering tube 58 there is a hydraulic reservoir 64 defined by the outer surface of metering tube 58, the back and front heads 16 and 24 and reservoir tube 66. Reservoir tube 66 is suitably sealed to the front and back heads by O-ring seals 68 and 70 is kept from rotating by pin 69.

To provide a return passage for the hydraulic fluid, there are large openings 82 in the inner metering tube 18 at a position near the top of these tubes (see FIGURE 1).

A closed cell cellular rubber accumulator 86 is provided near the bottom of the hydraulic reservoir 64. This internal accumulator accommodates rod displacement, prevents oil foaming, provides for thermal expansion of the oil, and prevents under and over filling of the unit with oil. It is retained in the lower half of reservoir 64 by a clover leaf-shaped retainer 88. The cellular rubber accumulator and its functions are more fully explained in Patent 3,070,363, granted Dec. 25, 1962, to J. T. Ellis, Jr.

To accomplish filling and draining of the reservoir 64, there are provided access ports at the front and rear ends thereof, such ports being suitably closed as by screw plugs 84.

The operation of the adjustable hydraulic shock absorber is believed to be evident from the foregoing description but a brief resume will be given. Initially, the shock absorber will be in the position shown in FIGURE 1 with the cylinder 18 and the reservoir 64 filled with hydraulic fluid and the spring 46 returning the piston 30 and bumper 44 to the position shown. Upon the application of a load to bumper 44 the rod 36 and piston 30 start moving downwardly and the piston forces the hydraulic fluid of oil from the inner metering tube 18 through metering orifices 48, 50, 52, etc., and on out through orifices 62 in the outer metering tube 58 into reservoir 64, while compressing the closed cellular rubber accumulator 86. The resistance to oil flow through orifices 48 and 62 and the other corresponding orifices governs the shock absorber's internal pressure which in turn sets up resisting forces to stop the load. The controlled deceleration and gentle stopping is accomplished because the kinetic energy of the moving rod and piston decays throughout the length of the stroke and approaches zero at the end of the stroke due to the longitudinal spacing of the metering orifices. In order to control the amount of hydraulic resistance, the outer metering tube 58 is rotated around the inner metering tube 18 by means of the adjustment assembly 14, the details of which are described hereinafter. The flow resistance of the passageways (one such passageway comprising, for example, orifice 48 and a corresponding orifice 62 and groove 54), and therefore the resistance to flow of hydraulic fluid therethrough, is a direct function of the relative angular position of the tubes 58 and 18.

On the downstroke of the piston the accumulator 86 is compressed by the incompressible hydraulic fluid. On the return stroke upon removal of the load, spring 46 returns the piston and piston ring check valve 32 allows hydraulic fluid passing through passages 82 from the reservoir to again fill up the cylinder 18 and the cellular rubber accumulator correspondingly expands back to its original shape.

It can thus be seen that the adjustable hydraulic shock absorber described above provides controlled load deceleration and stopping action which can be adjusted over a wide range of loads by effecting relative rotation of the cylinders 18 and 58 and thereby changing the flow resistance of the passageways through which the fluid escapes from the cylinder 18, to govern the shock absorber's internal pressure and establish the desired degree of resistance to the imposed load.

Although the invention, as disclosed herein, is described in terms of the specific arrangement as shown in the aforementioned Patent No. 3,344,894, it should be appreciated that the scope of the invention is not intended to be so limited and that other arrangements of ports and passageways are known to which the present invention can be applied. In fact, the present invention is intended for use in connection with any adjustable hydraulic shock absorber of the type embodying a pair of concentric relatively rotatable tubes or cylinders formed with passage means extending through the walls thereof, such passage means being of predetermined cross-sectional flow area configuration and being elongated a predetermined distance in the circumferential direction, so that relative rotation of the cylinders is operative to vary the effective cross-sectional flow area of the passage means and thereby change the effective load capacity of the shock absorber.

The adjustment assembly or turning mechanism 14 is uniquely adapted to be operatively associated with the type of adjustable shock absorber described above. The assembly 14 includes a mounting bushing 71 having an annular shoulder portion rested on, and attached as by brazing to, a mating opening in the front end of the wall of the reservoir tube 66. A turning shaft 73 extends through and is rotatably mounted in the bore of the bushing 71, there being an O-ring seal 72 incorporated to prevent leakage between the closely fitting portions of bushing 71 and shaft 73. The inwardly extending portion of the shaft 73 is enlarged so as to form a shoulder engaging the end of the bushing 71. A spur pinion gear 75 is suitably mounted on the innermost end of the shaft 73 so that rotation of the shaft effects corresponding rotation of the pinion gear 75. The pinion gear 75 mates with a thin circumferentially extending gear rack 77 which is attached to the front end of the outer metering tube 58 as by rivets 76, so as to be integral therewith. The thinness of the rack 77 obviates any problems of interference with the teeth of the pinion gear 75 that might otherwise occur because of the curvature of the rack 77. The rack 77 extends circumferentially at least a distance sufficient to effect full range rotation of the outer tube 58 relative to the inner tube 18. For example, rack 77 is illustrated in FIG. 1 as extending a full 180°, whereas in FIG. 2 only 90° of rack is shown. Stop pin 79 extends outwardly from tube 58 and is positioned so as to engage tie rods 15 and thereby limit rotation of the tube 58 in both directions. Advantageously, the flow restricting passageways through the tubes 18 and 58 can be arranged so that they extend circumferentially a distance substantially equal to the effective operative length of the gear rack 77 so as to allow maximum travel for full operating range and scale utilization. Rack 77 is seated on the lower annular shoulder 80 of tube 58 and extends toward the upper end of the tube and overlies the shoulder 81 of the tube. Tube 77 is stepped to provide the lower, outer annular shoulder 80 and the upper annular shoulder 81, the end section of tube 58 being reduced in diameter to provide a spacing from the teeth of gear rack 77 and a clearance for pinion gear 75.

A turning knob 91 is attached to the outwardly extending end of the shaft 73 by set screw 92. Locking screw 93 extends through knob 91 and is engageable with the outermost end face of bushing 71 so that the entire adjustment assembly 14 can be locked in position after the desired relative angular position of the tubes 18 and 58 has been established. The knob 91 is provided with a flange portion on the outwardly facing surface of which is provided a circular scale 95 marked in increments and registerable in relation to a fixed index marker 97. The advantages of full utilization of the circular scale 95 are attained by sizing the pitch diameter of the pinion gear 75 so that the circumference of the pitch diameter is substantially equal to the circumferential movement of the outer tube 58 over its entire range. In other words, the circumferential extent of the fluid escape passageways, divided by $\pi$ establishes the pitch diameter of the pinion gear 75 that will result in full utilization of the circular scale 95. It should be appreciated that the particular calibration of the scale 95 is dependent upon the cross-sectional configuration of the fluid escape passages.

Opposite from the adjustment mechanism 14 there is arranged an independent lock assembly 96 which may be used in addition to or in lieu of locking screw 93, depending on the environmental operating conditions. The assembly 96 includes a mounting bushing 98 affixed to the reservoir tube 66 and a locking pin 99 threadably mounted in the bushing 98 and arranged to be secured in engagement with the outer tube 58 to prevent its inadvertent movement.

From the above it will be appreciated that the described mechanism for adjusting the relative position of the tubes 18 and 58 that is uniquely accommodated for use in connection with a shock absorber of the class described. This mechanism eliminates a leakage problem by the simple expedient of the O-ring seal 72, thus providing a distinct advantage over the devices heretofore utilized. Furthermore, the mechanism is capable of easy manipulation, is positive in its action, and is readily adaptable for full utilization of the handy control knob 91 and associated circular scale 95 to effect accurate adjustment of the shock absorber 10 to the desired load-accommodating setting.

While the invention has been particularly shown and described with reference to a preferred embodiment thereof, it will be understood by those skilled in the art that various changes in form and details may be made therein without departing from the spirit and scope of the invention.

What is claimed is:

1. In an adjustable hydraulic shock absorber of the type having an outer body, an inner cylinder, a piston operable in said cylinder, and a tube within said body and rotatably fitting over said cylinder, said cylinder and tube being provided with corresponding openings defining a series of variable ports opening from the inner cylinder into the outer body of the shock absorber, said cylinder being provided with an outer flange which is engageable by one end of said tube, a spring interposed between the other end of said tube and the body of the shock absorber, said spring and flange serving to locate the tube axially upon said cylinder, a gear rack secured to the tube and having teeth spaced radially of the outer diameter of the tube and extending in the direction of the axis of the tube, a pinion having teeth meshing with the teeth of said rack and having a shaft projecting radially of the axis of the cylinder, said body having a sealed bearing opening adjacent said pinion and in which said shaft is turnable, the outer end of said shaft having a manually turnable wheel by which the pinion and the tube may be turned for the rotatable adjustment of the tube on the cylinder and the adjustment of said ports, releasable locking means projecting through said body and arranged to be secured in engagement with the tube to prevent its inadvertent movement.

2. In an adjustable hydraulic shock absorber of the type having an outer body, an inner cylinder, a piston operable in said cylinder, and a tube within said body and rotatably fitting over said cylinder, said cylinder and tube being provided with corresponding openings defining a series of variable ports opening from the inner cylinder into the outer body of the shock absorber, means locating said tube axially on said cylinder, said tube being stepped to provide first and second annular shoulders facing one end thereof, a gear segment supported on the first outer shoulder and overlying the second shoulder, means securing the gear segment against the tube intermediate the two shoulders thereof, said gear segment having teeth projecting toward said one end of the tube and radially spaced thereabout, a pinion having teeth meshing with the teeth of said gear segment and having a shaft projecting radially of the axis of the cylinder, said body having a sealed bearing opening adjacent said pinion and in which said shaft is turnable, the outer end of said shaft having a manually turnable wheel by which the pinion and the tube may be turned for the rotatable adjustment of the tube on the cylinder and the adjustment of said ports, a bushing in said body, and a locking pin threadably mounted in said bushing and adapted to releasably engage said tube.

References Cited

UNITED STATES PATENTS

| | | | |
|---|---|---|---|
| 1,147,089 | 7/1915 | Herman. | |
| 2,628,692 | 2/1953 | Hufferd | 188—97 |
| 3,168,168 | 2/1965 | Chorkey | 188—96 |
| 3,340,965 | 9/1967 | Ellis | 188—97 |
| 3,344,894 | 10/1967 | Kenworthy | 188—88 |

FOREIGN PATENTS 461,826   12/1949   Canada.

GEORGE E. A. HALVOSA, Primary Examiner

U.S. Cl. X.R.

188—96, 88